United States Patent [19]

Pessel

[11] 4,091,075

[45] May 23, 1978

[54] METHOD FOR REMOVING SULFUR DIOXIDE FROM FLUE GASES

[75] Inventor: Leopold Pessel, Wyndmoor, Pa.

[73] Assignee: American Electronic Laboratories, Inc., Colmar, Pa.

[21] Appl. No.: 678,291

[22] Filed: Apr. 19, 1976

Related U.S. Application Data

[63] Continuation-in-part of Ser. No. 545,928, Jan. 31, 1975.

[51] Int. Cl.$^2$ .................... C01B 17/00; C01B 17/72; B01D 53/034
[52] U.S. Cl. ..................................... 423/242; 423/522
[58] Field of Search ................................ 423/242–244, 423/522, 533, 534, 558

[56] References Cited

U.S. PATENT DOCUMENTS

| 2,173,877 | 9/1939 | Clark et al. ........................ 423/243 |
| 3,565,575 | 2/1971 | Warshaw ........................... 423/235 |
| 3,848,058 | 11/1974 | Poncet et al. ...................... 423/242 |
| 3,943,230 | 3/1976 | Yamamichi et al. ................ 423/242 |

FOREIGN PATENT DOCUMENTS

378,464   8/1932   United Kingdom ................ 423/242

Primary Examiner—O. R. Vertiz
Assistant Examiner—Gregory A. Heller
Attorney, Agent, or Firm—Jacob Trachtman

[57] ABSTRACT

In a "first" scrubbing operation, the sulfur dioxide containing flue gas is scrubbed with an aqueous solution containing ferric sulfate and aluminum sulfate. The ferric sulfate oxidizes the sulfur dioxide to sulfuric acid, which dissolves in the solution, and is reduced to ferrous sulfate. In a subsequent "second" scrubbing operation, the solution, now containing ferrous sulfate, aluminum sulfate, and sulfuric acid, is scrubbed with air. This regenerates, or re-oxidizes the ferrous sulfate to ferric sulfate. The presence of aluminum sulfate accelerates the rate of regeneration. The regenerated solution is then returned to its function in a "first" scrubbing operation, and the indicated cycle of "first" and "second" scrubbing operations are repeated.

28 Claims, 1 Drawing Figure

U. S. Patent     May 23, 1978     4,091,075
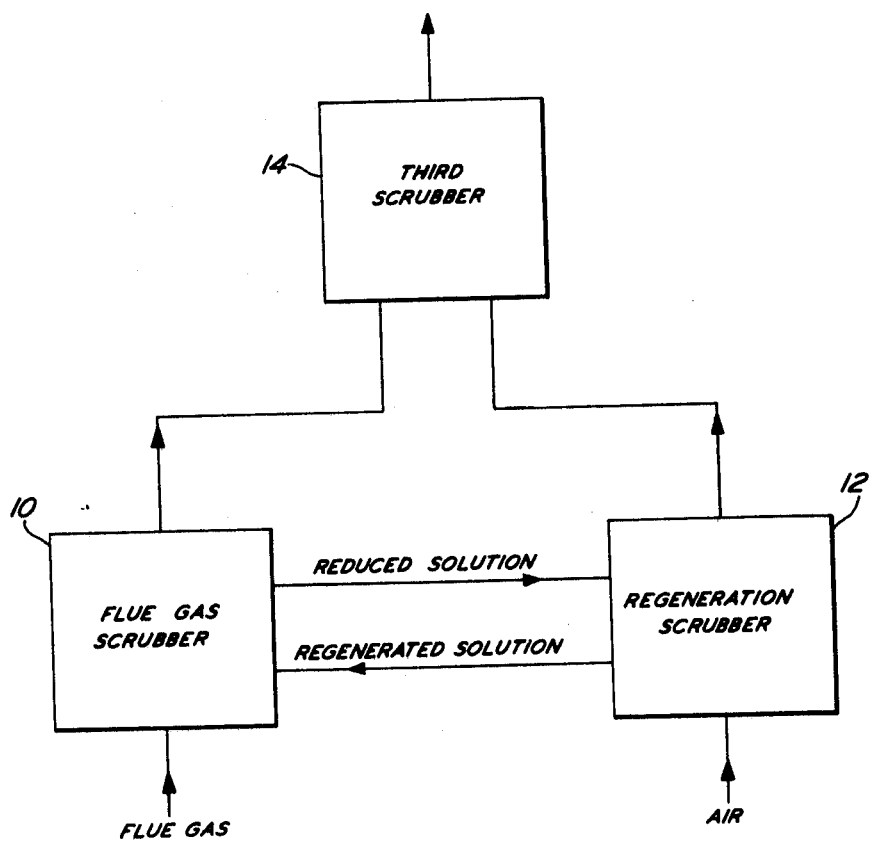

METHOD FOR REMOVING SULFUR DIOXIDE FROM FLUE GASES

This is a continuation-in-part of my application Ser. No. 545,928, filed on Jan. 31, 1975.

The present invention relates to a method and composition for removing sulfur dioxide from flue gases, and particularly to a method which is economical in that the ingredients are regenerated and recycled for long usage life, and when exhausted are in a form which has other commercial usage.

The invention disclosed herein pertains to certain improvements in a process described in my currently pending U.S. application for patent Ser. No. 545,928 entitled "Method of Removing Sulfur Dioxide From Flue Gases." The improvements pertain, first, to compositions novel in fluids used for scrubbing flue gases, which compositions greatly accelerate the rate of "regeneration" in the air-scrubbing stage which is part of this process. Additional corollary improvements pertain to means of improving the efficiency of the process, and to means of enhancing its economic attractiveness.

Therefore, it is an object of the present invention to provide a novel method and composition for removing sulfur dioxide from flue gases.

It is another object of the present invention to provide a method and composition for removing sulfur dioxide from flue gases in which the materials used can be regenerated and recycled for economic operation.

It is still another object of the present invention to provide a method and composition for removing sulfur dioxide from flue gases in which the materials used can be regenerated and recycled, but when completely exhausted are in a form which has commercial utility.

Other objects will appear hereinafter.

These objects are achieved by a method and composition wherein the sulfur dioxide containing flue gases are scrubbed with an aqueous solution of ferric sulfate which oxidizes the sulfur dioxide to sulfuric acid which dissolves in the solution. The ferric sulfate is reduced to ferrous sulfate. The solution is then scrubbed with air to reoxidize the ferrous sulfate to ferric sulfate and thereby regenerate the solution for use in removing additional sulfur dioxide from the flue gas. An improvement is the addition of aluminum sulfate to the solution which accelerates the rate of regeneration.

For the purpose of illustrating the invention there is shown in the drawing a form which is presently preferred; it being understood, however, that this invention is not limited to the precise arrangements and instrumentalities shown.

The FIGURE of the drawing is a flow chart of the method of the present invention.

As shown in the drawing, the sulfur dioxide containing flue gas is passed into a flue gas scrubber 10 in Stage I which contains an aqueous solution of ferric sulfate and, in the disclosed improvement also aluminum sulfate. Subsequently, the reduced solution from the scrubber 10 is passed to a regeneration scrubber 12 in Stage II. The regenerated solution is returned from the scrubber 12 to the flue gas scrubber 10.

In the process described herein, the flue gases are scrubbed with an aqueous fluid containing a substantial amount of a ferric salt, such as ferric sulfate. The sulfur dioxide reacts with the ferric salt, forming sulfur trioxide wich is absorbed by the fluid as sulfuric acid. Simultaneously, the ferric salt is reduced to ferrous salt. This stage of the process is subsequently referred to as "Stage I".

In A subsequent "regenerating" stage, the fluid is scrubbed with air. This re-oxidizes the ferrous salt to ferric salt. This stage of the process is subsequently referred to as "Stage II".

By subjecting the fluid alternatingly to Stage I and Stage II, the method is capable of converting all of the sulfur dioxide in the flue gas to sulfuric acid which progressively increases in concentration in the fluid. It should be noted that Stage I and Stage II simply refer to whether the scrubbing is done with flue gas or with air, respectively. This can be accomplished by shifting either the scrubbing fluid or the gas streams into or out of some specific scrubbing equipment. Many types of scrubbing equipment are being manufactured and the specific type to be used in this process is not part of this invention.

In Stage I, the governing chemical reaction is

$$Fe_2(SO_4)_3 + H_2SO_3 + H_2O \rightarrow 2FeSO_4 + 2H_2SO_4$$

It should be noted that this reaction proceeds without the presence of gaseous oxygen and without the initial presence of sulfuric acid. It is true that flue gas may also contain air and that sulfuric acid is formed in accordance with the above shown formula. But under conditions where the treated flue gas would be free of air or oxygen, and where the formed sulfuric acid would be instantly removed or neutralized, the reaction in accordance with Stage I would still take place. No catalyst to speed up this reaction is needed or used.

This is an important distinction between this process and three subject-related U.S. Pat. Nos. 2,021,936, 2,342,704 and 3,836,630. In these cited references, gaseous oxygen absorbed in a diluted sulfuric acid solution reacts with sulfur dioxide contained in the flue gas with the aid of a catalyst. The catalyst is selected from ferric and manganese ions and is present in very small amounts, normally a fraction of one percent, 0.6% by weight being the highest cited amount.

On the other hand, in the process disclosed herein, the formation of sulfuric acid requires only the presence of sulfur dioxide, water, and a ferric salt. The reaction proceeds with great speed, over a wide range of temperature, and requires no catalyst to speed it up. However, the process does require a sufficient amount of ferric salt to react with all of the sulfur dioxide present.

Consequently, the amount of ferric salt present in the scrubbing fluid will be far greater than the amount needed in the cited "catalyst" patents for providing up to 0.6% by weight of ferric ions. The amount of ferric salt called for in this process will provide preferably above 1% of ferric ions, ranging up to 4% or higher, depending on the amount of sulfur dioxide in the flue gas treated.

In order to react with all of the sulfur dioxide present, there should always be a certain amount of excess of ferric salt present, in Stage I. While normally a certain amount of air may be present in the flue gas to provide a certain degree of regeneration of ferrous to ferric ions even during the normal Stage I operation, this may not always be sufficient. Consequently, an important aspect of this process is the introduction of a separate "Stage II" to assure that ferric ions are always available in the required excess for operation of Stage I.

In Stage II, the ferrous ions are oxidized to ferric ions by scrubbing with air. The reaction proceeds according to the stoichiometric relationship

After the completion of Stage II, the scrubbing composition is ready to be returned again to its function in Stage I. The invention also contemplates the utilization of a Stage III which functions as follows.

The flue gases which leave the flue gas scrubber 10 after the sulfur dioxide is removed, and the air leaving the regeneration scrubber 12 may be fed into a third scrubber 14 which contains an aqueous solution of a nitrogen compound of a basic nature, such as urea $CO(NH_2)_2$ or guanidine $NHC(NH_2)_2$. The purpose of the third scrubber 14 is to trap and absorb any acid mist that may be carried by the gas streams from the flue gas scrubber 10 and the regeneration scrubber 12. The reaction of the acid mist with the solution in the third scrubber 14 may form addition products, which can be ultimately utilized commercially for agricultural fertilizing purposes because of their high nitrogen content. Also, depending on the composition of the flue gas, which may vary widely, such additional scrubbing may also trap and possibly decompose some nitrogen containing combustion gas products, such as in the reaction of urea with nitrous acid:

$$CO(NH_2)_2 + 2NHO_2 \rightarrow CO_2 + 3H_2O + N_2$$

Thus, the third scrubbing can provide additional ecological benefits as well as providing additional commercially usable products.

Thus, there is provided by the present invention a method of removing sulfur dioxide from flue gases in which the materials used are regenerated so as to minimize the amount of material required and thereby minimize the overall cost of the operation. Also, the method can be carried out using standard, commercially available equipment. In addition, the method results in the formation as by-products of materials, such as sulfuric acid, and high-nitrogen content fertilizer materials, which can be sold commercially to further reduce the overall cost of the method.

The above described reaction

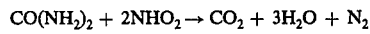

proceeds at a much slower rate than the reaction governing Stage I, as will be further discussed below.

The shift from Stage I to Stage II is preferably carried out before all of the ferric ions have been reduced to ferrous ions and while there is still an ample supply of the former. This is considered desirable not only from the point of view of maintaining an adequate mass relationship between the sulfur dioxide in the gas and the ferric salt in the fluid. In addition, there has been some evidence that the presence of ferric ions in the fluid during Stage II exerts an accelerating effect of the oxydation of the ferrous ions. Generally speaking, it is anticipated but not restricted in that respect, that the shift from Stage I to Stage II will be carried out only when there are still from 20-50% of the iron ions in the ferric state. This consideration is subject to a number of operating factors, such as the composition of the flue gas with respect to self-regeneration and SO content, the efficiency of both gas and air scrubber, number of air scrubbers (it is anticipated that more than one of these may be used), etc.

The shift from Stage II to Stage I may also take place before complete regeneration of ferrous to ferric ions has taken place. This will also depend on operational factors, demand for scrubbing fluid (even if only partly regenerated), etc.

While the regenerating Stage II proceeds very rapidly in relatively neutral ferrous sulfate solutions, it is slowed down considerably when the solutions are acidified. The mechanism of this slowing down has not been completely clarified, but has been discussed in some detail in the following reference works:

Mellor - Comprehensive Treatise on Inorganic and Theoretical Chemistry 1935. Volume 14, Pages 265-268

Gmelin's Handbook of Inorganic Chemistry 1932. Volume 59, Pages 805-815, in the chapter "Transition reactions $Fe^{..} \rightleftarrows Fe^{...}$"

The regenerating action can be accelerated by increasing the temperature. However, even greater acceleration is desirable in acidic solutions. This is due to the fact that in the flue gas treatment described, the sulfuric acid content of the scrubbing fluid increases continuously, as it is being shifted repeatedly from Stage I to Stage II, and back again.

Consequently, acceleration by chemical means in Stage II is of great practical importance. The greater this acceleration, the less the need for additional air scrubbers, and the less the frequency (and power expense) in carrying out the shifts between the stages. Among other advantages of "chemical" acceleration is less dependence on and lower cost of thermal acceleration.

I have now discovered that the rate of regeneration of ferrous ions to ferric ions in solutions which also contain considerable amounts of sulfuric acid by air blown through these solutions can be greatly accelerated by the presence of an aluminum slt, such as aluminum sulfate, in these solutions.

In the course of various tests, the approximate relationship between the concentration of sulfuric acid in aqueous ferrous sulfate solutions and their rate of oxidation to ferric sulfate by blowing air through the solutions was established. Using "thermal" acceleration by maintaining the solutions at 80° C and a total aeration time of 5 hours, the following approximate relationships were established for a solution containing 20% of $FeSO_4 - 7H_2O$:

| Weight % $H_2SO_4$ | Weight % of total iron converted to Ferric ions |
| --- | --- |
| 2 | 66 |
| 10 | 27 |
| 20 | 33 |
| 40 | 60 |
| 50 | 100 |

The slowest rate of oxydation is in the range of 10–20% by weight of $H_2SO_4$ content. Addition of aluminum sulfate accelerates the rate of oxydation in solutions containing various concentrations of sulfuric acid and ferrous sulfate.

As a typical example, the following tabulation shows the rate of acceleration due to varying amount of aluminum sulfate in aqueous solutions containing in weight %, $H_2SO_4$ 20% and $FeSO_4 - 7H_2O$ 20%. The solution temperature was 80° C and the time of aeration was 5 hours.

| Weight % of $Al_2(SO_4)_3 - 16 H_2O$ in the solution | Weight % of total iron converted to ferric ions |
|---|---|
| 1.12 | 34 |
| 10 | 36 |
| 20 | 40 |
| 30 | 41 |

It is seen, that without the presence of aluminum sulfate, the rate of oxydation in a solution containing 20% by weight of $H_2SO_4$, under the stated conditions, is 33%. By adding 10, 20, and 30 weight percent of $Al_2(SO_4)_3 - 16H_2O$ to the solution, this rate is increased to 36, 40, and 41%, respectively.

The described effect is noticeable already with an addition of 1.12% by weight of the aluminum salt, providing 0.05% by weight of aluminum ions in solution. A small, but noticeable, increase in the rate of oxydation to 34% is observed.

In the above given examples, the percentage of the aluminum salt is such that the composition is not only a liquid at an elevated temperature anticipated for scrubbing (such as 80° C, as an example), but also a liquid when cooled to ambient room temperature.

However, an even greater acceleration of the rate of oxydation of the ferrous salt can be attained if the amount of aluminum salt is increased to such a level that the resulting composition, while a liquid at an anticipated scrubbing temperature of above 70° C, becomes a solid when cooled to ambient room temperature.

As an example, a composition is prepared containing its approximate parts by weight: Water 36, concentrated sulfuric acid 8, $FeSO_4 - 7H_2O$ 16 (providing about 4.57 parts of $Fe_2O_3$ equivalent), and $Al_2(SO_4)_3 - 16H_2O$ 40 (providing about 6.48 parts of $Al_2O_3$ equivalent). The components are mixed and heated until a homogeneous liquid is formed. After 5 hours of air scrubbing at 80° C, about 50% of the nominal total of about 4% iron ions present are oxidized from the ferrous to the ferric state.

The above composition, as an example of many other possible ones with variations in composition which would be rather obvious to a technical person, is a solid at room temperature. It has to be heated to about 70°–75° C (about 170° F) to be sufficiently fluid to serve as a scrubbing fluid at about 80° C (about 180° F).

Heating the fluid to that temperature level, or even a higher one, to obtain thermal acceleration is, of course, desirable. However, another advantage, and one that is novel and unexpected, is to use a composition such as the above described example, which is a fluid in the temperature range where it is used for scrubbing but becomes a solid when cooled down to ambient temperature. The importance of this feature arises from the fact that for subsequent industrial utilization of the scrubbing fluid, its state of being a solid rather than a liquid at room temperature facilitates handling, transportation and shipment, and thus presents an economic advantage.

While indications were obtained that aluminum salts other than the sulfate have an accelerating effect similar to that of the sulfate, the use of the latter is a preferred embodiment, of this invention. This preference is a matter of convenience, because the whole system involved is a sulfate system and addition of other anions may, or may not, introduce other complications.

Also, the exact composition of the aluminum sulfate may be subject to variations. The above indicated composition of $Al_2(SO_4)_3 - 16H_2O$ is the label designation of a well known manufacturer of laboratory reagents. However, the American Chemical Society Specifications for this compound admit a variation in the degree of hydration between 14 and 18 molecules of $H_2O$ and on the labels of other manufacturers, the hydration content is 18 molecules of $H_2O$. Also known are other hydration values, such as 9 molecules of $H_2O$ and, of course, the water-free compound $Al_2(SO_4)_3$. In an aqueous solution system these differences become meaningless and it is desired that, where ratio quantities of salts are referred to such as the ratios between aluminum and iron salts, these shall be reduced to a ratio between $Al_2O_3$ and $Fe_2O_3$ equivalents.

Generally, it is preferred that the amount of aluminum salt in the composition is not less than 10% of that of the iron salt present. However, amounts far exceeding this proportion and far greater than the amount of iron salt present may have important advantages. The latter may pertain not only to the increase in the rate of regeneration but to other economic advantages as will be brought out below.

From the above, it is seen that by the addition of an aluminum salt, such as aluminum sulfate, a 50% increase in the rate of regeneration, i.e. from about 33 to about 50%, can be obtained.

Combined with the use of thermal acceleration in Stage II, obtained by the use of heat exchangers, etc., the use of an aluminum salt in combination with an iron salt provides an important improvement of the flue gas treatment previously disclosed.

The efficiency and economy of the process is greatly improved by requiring less frequent cycling, by decreased costs, and other advantages.

Therefore, one purpose of this invention is to provide a composition for the scrubbing of flue gases in order to remove sulfur dioxide from them, said composition containing a varying amount of sulfuric acid, a compound of iron providing ferric ions in excess of 0.6%, and an aluminum compound providing aluminum ions in an amount of not less than 0.05% by weight.

Another purpose is to provide a process for removing sulfur dioxide from flue gases by scrubbing them with a composition containing ferric ions in excess of 1% and an aluminum compound providing not less than 0.05% of aluminum ions.

Still another purpose is to provide a process for removing sulfur dioxide from flue gases by scrubbing them with a composition containing varying amounts of sulfuric acid, ferric ions in excess of 1%, not less than 0.05% of aluminum ions, said process also including a stage in which said composition is scrubbed with air to convert ferrous to ferric ions.

Still another purpose is to provide a process for removing sulfur dioxide from flue gases by scrubbing them with a composition containing an iron salt providing not less than 1% of ferric ions, such as ferric sulfate, and an aluminum salt, such as aluminum sulfate in a weight percentage exceeding that of the iron salt.

Still another purpose is the one described above, providing that the process includes a regenerating stage in which the composition is scrubbed with air to oxidize the ferrous to ferric ions, also providing that the composition is held at not lower than 70° C to keep it liquid during scrubbing, but also providing such a content of aluminum sulfate that the composition is a solid at ambient room temperature.

In the process disclosed herein, the amount of iron compound in the composition is such that, if complete solution is obtained, the amount of iron ions will be in excess of 0.6%, preferably in excess of 1%, and still more preferably 4%, or even higher. With increasing concentration of sulfuric acid in the composition, the solubility of the iron salts, such as ferric or ferrous sulfate, decreases and the iron compound may be present as a solid phase suspended in the composition, giving the latter the nature of a suspension or slurry. An excess of ferric compound, although not in solution, may still be capable of reacting with sulfur dioxide. Therefore, no upper limit of the ferric content of the composition is conceived and a content of iron compound beyond its saturation limit in the scrubbing composition is considered to be within the scope of this invention.

The amount of aluminum compound in the composition will generally be such that a minimum of 0.05% by weight of aluminum ions will be present. However, a higher percentage is more desirable and, as a matter of accelerating the rate of regeneration in Stage II, the highest possible weight percentage will be aimed at. Just like in the case of iron compounds, the solubility of aluminum compounds, such as aluminum sulfate, decreases with increasing acid concentration. As a consequence, a certain amount of such an aluminum compound may also be present as a solid phase and may give the composition, like in the case of undissolved iron compound, the nature of a suspension or slurry, as it then contains the aluminum compound in a weight percentage above its saturation limit.

The invention conceives no upper limit in the amount of iron sulfate and aluminum sulfate present in the composition, beyond the practical necessity to maintain its fluidity adequate to act as a scrubbing medium, which also depends on the operating temperature provided. Lower limits may be set for a variety of operating reasons and for reasons depending on the ultimate destination of the scrubbing compound.

A composition in accordance with this invention may be prepared by dissolving an iron salt, for example a commercial grade of ferric sulfate, and an aluminum salt, such as a commercial grade of aluminum sulfate, in water. Sulfuric acid may, or may not, be added at this stage.

An alternate, and economically more desirable method of preparing the composition of this invention is to use, in place of commercial grades of iron and aluminum salts, iron and aluminum containing waste materials or naturally occurring mineral deposits. Examples for such iron sources would be "red mud" wastes from the Bayer process, bog ores, etc. Examples for such aluminum sources would be calcined clay, ferruginous bauxite, bauxitic clay, etc. To bring such material into solution, sulfuric acid, or a flue gas scrubbing fluid containing such acid, would be used. Also involved would be a leaching process and leaching equipment. Both such processes and equipments are well known and are no part of this invention.

The sulfuric acid content of the scrubbing composition increases progressively in proportion to the amount of sulfur dioxide converted. For some purposes, especially where sulfuric acid itself is a desired end product of the process, the increase in sulfuric acid content may be permitted to continue to the highest attainable concentration.

However, for other purposes it is desirable to set an upper limit to the acid content of the composition. As an embodiment of this invention, this is accomplished by incorporating a leaching phase into the process by integrating the scrubbing and leaching phases as described below. In such an integration, the scrubbing composition is permitted to react with some material, of the class mentioned above, while the composition is still hot, either heated by the flue gas in Stage I or after Stage II where it has been heated by heat exchangers, etc. The effectiveness of leaching is greatly increased and the expenses of additional heat input are avoided or minimized. Depending on the material to be leached, the acid concentration may vary over a wide range. Generally, it will be from 2% upwards, with about 20% of $H_2SO_4$ presenting an optimum for most leaching operations. By selecting leaching material, time, temperature, etc. a desirable percentage of acid content in the composition may be maintained. In addition, this integrated leaching phase provides a convenient method of adding materials such as iron or aluminum, and possibly other materials, to the composition.

While the predominant concept of integration of scrubbing and leaching is based on utilization of the residual heat in the scrubbing composition, this is not absolutely exclusive of introduction of additional heat either before, during, or after the leaching step. Utilization of such additional heat inputs is within the concepts of this embodiment.

Another area of benefits arising from the integration of the scrubbing and leaching steps lies in the combination of operations to eliminate undesirable solids and particulates by filtering, centrifuging, settling, etc. The particulates in the flue gases which will not dissolve in the scrubbing fluid, such as silica, silicates, carbon, soot, etc., as well as the insolubles from the leaching step, can be eliminated in one joint operation. The advantages from the point of view of heat economy, equipment investment, handling and disposal of refuse, etc., are obvious.

The above described integration of scrubbing and leaching can be applied usefully for the recovery and concentration of various materials. As an example, it can be used to extract copper from low-grade copper-containing deposits which are not economically exploitable by other means. Utilization for the recovery of other mineral values is obvious.

However, an important embodiment of the integration of scrubbing and leaching with the disclosed composition lies in the utilization, for material to be leached, of a natural mineral deposit, or equivalent material, which is high in content of acid-soluble aluminum compounds. Such a deposit may be clay (particularly after calcining) bauxitic clay, bauxite, ferruginous bauxite, latherite, alunite, dawsonite, coal waste shale, etc.

Thus, the scrubbing composition acquires a progressively increasing content of aluminum. This aluminum content is not only beneficial from the point of view of accelerating the rate of regeneration. In addition, it enhances the economic attractiveness of this process by making the scrubbing composition a raw material for the recovery of aluminum sulfate, aluminum oxide, and, ultimately, metallic aluminum. As an example for such possible utilization, the Potassium Alum Process mentioned on pages 19 – 23 of Reference No. 1 (see below) is referred to.

The growing economic interest in U.S. domestic mineral deposits for the production of aluminum is shown in the following references. Also shown in them are various aluminum-containing mineral deposits which would be potentially useful leaching materials in accordance with the process described herein.

1. Revised and Updated Cost Estimates for Producing Alumina from Domestic Raw Materials. Frank A. Peters and Paul W. Johnson. Information Circular 8648. Bureau of Mines 1974. U.S. Dept. of the Interior.

2. Alumina from Domestic Resources. A miniplant Project to Evaluate Alumina Recovery Processes. Bureau of Mines 1974. U.S. Dept. of the Interior.

3. Potential Sources of Aluminum. Information Circular 8335. Staff. Bureau of Mines 1967. U.S. Dept. of the Interior.

4. Bauxite Reserves and Potential Aluminum Resources of the World. Sam H. Patterson. Geological Survey Bulletin 1228. (1967) Geological Survey - U.S. Dept. of the Interior.

As a consequence, an additional purpose of this invention is to provide a process for the removal of sulfur dioxide from flue gases by means of a fluid scrubbing composition containing an iron salt and an aluminum salt, in which the alternating steps of scrubbing with flue gas and with air are integrated with a leaching operation, in which the composition, heated as a consequence of the scrubbing procedures, extracts aluminum compounds, or other useful materials, from mineral deposits, waste materials, and the like.

Thus the major economic advantages and benefits of this invention are seen in the integration of a solution to three problems of major economic impact.

A. Energy Sufficiency

The described process removes sulfur dioxide from flue gases in a highly complete and efficient manner. It is fully regenerative and eliminates the ecologic calamity of disposing and dumping of hundreds of millions of tons per year of useless sludges resulting from the heretofore favored processes based on lime scrubbing. In an ecologically acceptable manner, the process permits the utilization of the nearly inexhaustible supply of high sulfur coals available in the U.S., thus assisting in making the U.S. independent from imported sources of energy.

B. Utilization of Sulfur

The many millions of tons of sulfur locked up in these coals, heretofor considered an ecologic nuisance and danger, now acquire the status of a major national resource. Transferred by this process to sulfuric acid, the U.S. may easily become the largest producer of this chemical (and its derivatives) in the world, not only with ample supplies to meet its domestic needs, but also with a huge exportable surplus.

C. Utilization of domestic alumina sources

A specific embodiment of this invention is to link the sulfuric acid obtained in the flue gas scrubbing with the extraction of alumina from the nearly inexhaustible low-grade domestic mineral sources containing alumina. The low cost and abundance of the sulfuric acid derived from this process may give new impetus to the growing interest of making the aluminum industry independent from imported alumina. This could accelerate a change in the relatively neglected status of low-grade domestic alumina minerals to that of a major economic resource.

The present invention may be embodied in other specific forms without departing from the spirit or essential attributes thereof and, accordingly, reference should be made to the appended claims, rather than to the foregoing specification as indicating the scope of the invention.

What is claimed is:

1. A method of removing sulfur dioxide from flue gas comprising the steps of:
   (a) subjecting the sulfur dioxide containing flue gas to an aqueous composition containing a compound of iron capable of providing ferric ions in excess of 0.6 weight percent and in which the iron ion can be reduced by sulfur dioxide from a higher valence state to a lower valence state and thereby oxidize the sulfur dioxide to sulfuric acid, and an aluminum compound capable of providing aluminum ions in an amount of not less than 0.05 weight percent, and
   (b) subjecting the aqueous composition containing said iron compound in its lower valence state to the action of oxygen to reoxidize the reduced iron salt to its higher valence state and thereby regenerate the aqueous composition for use in removing additional sulfur dioxide from the flue gas.

2. The method in accordance with claim 1 in which the aluminum compound is a salt of aluminum to provide the aluminum ions.

3. The method in accordance with claim 1 in which the aluminum compound is aluminum sulfate.

4. The method in accordance with claim 3 in which the composition contains at least 1.12% by weight of aluminum sulfate.

5. The method in accordance with claim 1 in which the aqueous composition to which the flue gas is subjected is at least slightly acidic with sulfuric acid.

6. The method in accordance with claim 1 in which the iron compound is ferric sulfate, and the aluminum compound is aluminum sulfate.

7. The method in accordance with claim 1 in which the amount of iron ions present in the aqueous mixture is not less than 1 percent by weight and the aluminum compound is in a proportion of not less than 10 weight percent with respect to the weight of the iron compound, said proportion being based upon the ratio of the equivalent $Al_2O_3$ to the equivalent $Fe_2O_3$ derived from the compounds.

8. The method in accordance with claim 1 in which the iron compound provides iron ions in the aqueous mixture in excess of 1 percent by weight, and the aluminum compound is present in a weight percentage greater than that of the iron compound based upon the ratio of the equivalent $Al_2O_3$ to the equivalent $Fe_2O_3$ derived from the compounds.

9. The method in accordance with claim 6 in which the amount of aluminum ions present in the aqueous composition corresponds to the solution saturation limit of the aluminum compound in the aqueous composition.

10. The method in accordance with claim 6 in which the amount of iron ions present in the aqueous composition corresponds to the solution saturation limit of the iron compound in the aqueous composition.

11. The method in accordance with claim 6 in which the amount of aluminum compound present in the aqueous composition is greater than that corresponding to the solution saturation limit of the aluminum compound in the aqueous composition.

12. The method in accordance with claim 6 in which the amount of iron compound present in the aqueous composition is greater than that corresponding to the solution saturation limit of the iron compound in the aqueous composition.

13. The method in accordance with claim 6 in which the aqueous composition is subjected to the flue gas until a predetermined amount but not all of the iron compound is reduced.

14. The method in accordance with claim 13 in which the aqueous composition is subjected to the flue gas until about 90 weight percent of the iron compound is reduced.

15. The method in accordance with claim 13 in which the aqueous composition is subjected to the flue gas until about 50 weight percent of the iron compound is reduced.

16. The method in accordance with claim 6 in which the composition containing iron sulfate and aluminum sulfate is passed through a flue gas scrubber, and subsequently the composition containing the reduced iron compound is passed from the flue gas scrubber to a regeneration scrubber and air is passed through the regeneration scrubber to reoxidize the iron compound in the composition.

17. The method in accordance with claim 16 in which the aqueous composition to which the flue gas is subjected is at least slightly acidic with sulfuric acid.

18. The method in accordance with claim 16 in which the composition in the flue gas scrubber is subjected to the flue gas until a predetermined amount but not all of the iron salt is reduced.

19. The method in accordance with claim 18 in which the aqueous composition is subjected to the flue gas until about 90 weight percent of the iron salt is reduced.

20. The method in accordance with claim 18 in which the aqueous composition is subjected to the flue gas until about 50 weight percent of the iron salt is reduced.

21. The method in accordance with claim 16 in which the composition is repeatedly cycled between the flue gas scrubber and the regeneration scrubber to produce a progessively increasing content of sulfuric acid.

22. The method in accordance with claim 6 in which the gases after being subjected to the iron salt mixture are passed through an aqueous solution of a nitrogen compound selected from the group consisting of urea and guanidine.

23. The method in accordance with claim 16 in which the gases which leave the flue gas scrubber are passed through a third scrubber containing an aqueous solution of a nitrogen compound selected from the group consisting of urea and quanidine.

24. The method in accordance with claim 16 in which the gases which leave the flue gas scrubber and the regeneration scrubber are passed through a third scrubber containing an aqueous solution of a nitrogen compound selected from the group consisting of urea and guanidine.

25. The method in accordance with claim 22 in which the composition is repeatedly cycled between flue gas scrubber and air scrubber to produce a progressively increasing content of sulfuric acid.

26. The method in accordance with claim 21 in which the composition containing sulfuric acid is brought in contact with a material selected from a group comprising inorganic waste materials and mineral deposits to leach therefrom acid-soluble material.

27. A method in accordance with claim 26 in which the acid-soluble material is predominantly composed of oxydic aluminum compounds.

28. A method in accordance with claim 26 in which the composition is maintained at a temperature substantially above ambient room temperature.

* * * * *